(12) United States Patent
Nakatani et al.

(10) Patent No.: US 8,065,564 B2
(45) Date of Patent: Nov. 22, 2011

(54) REDUNDANT CONTROL APPARATUS

(75) Inventors: Hiroshi Nakatani, Tokyo (JP); Naoto Seto, Tokyo (JP); Makoto Toko, Saitama-ken (JP); Eigo Fukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/837,059

(22) Filed: Jul. 15, 2010

(65) Prior Publication Data

US 2011/0138230 A1 Jun. 9, 2011

(30) Foreign Application Priority Data

Dec. 8, 2009 (JP) ................................. 2009-278543

(51) Int. Cl.
*G06F 11/00* (2006.01)
(52) U.S. Cl. .......................................... 714/37; 714/11
(58) Field of Classification Search .................... 714/37, 714/4.11, 6.3, 6.32, 10–13, 47.1, 57
See application file for complete search history.

(56) References Cited

U.S. PATENT DOCUMENTS

| | | | | |
|---|---|---|---|---|
| 6,754,846 B2 * | 6/2004 | Rasmussen et al. | ............ | 714/11 |
| 6,988,221 B2 * | 1/2006 | Rasmussen et al. | ............ | 714/12 |
| 2009/0044049 A1 * | 2/2009 | Luick | .............................. | 714/11 |

* cited by examiner

*Primary Examiner* — Dieu-Minh Le
(74) *Attorney, Agent, or Firm* — Oblon, Spivak, McClelland, Maier & Neustadt, L.L.P.

(57) ABSTRACT

First and second processing units execute the same control program to the same input data in parallel. An input/output unit generates the input data and receives one of two output data executed by the first and second processing units. A channel selection unit sends the input data to the first and second processing units and sends the one to the input/output unit by selecting the one from the two output data. In the first and second processing units, a control cycle synchronization unit generates a control cycle signal at a control cycle, a processor executes the control program, a data memory stores operation data including the input data, intermediate data being executed and output data executed by the processor. A diagnostics unit generates summary information by compressing the operation data and comparatively decides whether the summary information matches the other summary information of the other processing unit every control cycle.

4 Claims, 6 Drawing Sheets

REDUNDANT CONTROL APPARATUS

CROSS-REFERENCE TO RELATED APPLICATION

This application is based upon and claims the benefit of priority from Japanese Patent Application No. 2009-278543, filed on Dec. 8, 2009; the entire contents of which are incorporated herein by reference.

FIELD OF THE INVENTION

The present invention relates to a redundant control apparatus having two processing units to execute the same processing in parallel and comparatively decide whether two processing results match.

BACKGROUND OF THE INVENTION

In order to monitor a plant or safely control a field device, an information processing apparatus of which control system is redundant is known. As to this information control apparatus, a stand-by control apparatus to set one of two control channels to stand-by status, and a redundant control apparatus to duplicate two control channels (to attach importance to safety), are known.

As to the redundant control apparatus, in general, a first processing unit and a second processing unit to respectively (independently) execute the same processing are equipped. In the first and second processing units, a diagnostics unit to compare two operation data (processing results of the first and second processing units) and decide failure of the apparatus itself is equipped. Briefly, the redundant control apparatus to comparatively decide operation data without falling throughput of the first and second processing units is disclosed (For example, refer to Japanese Patent No. 396599 (Patent reference 1)).

Furthermore, as technique to comparatively decide whether two data match, in order to detect falsification of data, a hash value calculated from original data not falsified is compared with a hash value calculated from data possibly falsified (For example, refer to JP-A 2005-242871 (Kokai) (Patent reference 2)).

Furthermore, in a system which cannot compare original data not falsified with data possibly falsified, by comparing a hash value calculated from data possibly falsified to a hash value previously attached to the data, technique to detect falsification is disclosed (For example, refer to JP-A 11-285582 (Kokai) (Patent reference 3)).

In the redundant control apparatus, a diagnostics unit to detect failure of the apparatus itself by comparatively deciding whether operation data from two channels (two processing units) match, is equipped. In order to improve reliability of decision processing of the diagnostics unit, it is necessary to minutely compare the operation data from two channels, such as not only output data from the two processing units, but also input data to be operated and intermediate data being operated by the two processing units. Hereinafter, these data are called "operation data".

For example, as to a diagnostics function of which comparison object is output data only, when intermediate data is an injustice value by failure of the processing unit of one channel, it rarely happens that output data is a justice value. This failure cannot be detected only by comparing output data from two channels. As a result, reliability of comparison decision processing by the diagnostics unit falls.

However, if all of the input data, the intermediate data and the output data of the processing unit are used to be compared, a data quantity for comparison is greatly larger than output data only for comparison. Accordingly, comparison decision processing by two processing units is not completed within an execution time to be previously set. As a result, processing speed of the processing unit falls.

In the redundant control apparatus having two processing units, if the processing speed falls, a control cycle of the apparatus becomes late, and control performance thereof also falls. Briefly, improvement of reliability of failure diagnostics by increasing the data quantity to be compared and acceleration of the execution time of comparison decision processing represent trade-off.

In technique disclosed in Patent reference 1, operation data from two channels can be synchronized. However, when the operation data increase, a processing time to compare the operation data is more taken. Furthermore, in technique disclosed in Patent references 2 and 3, falsification of the data can be detected. However, as to a large quantity of operation data by two processing units in the redundant control apparatus, technique to diagnose unmatch of the operation data within a control cycle (previously set in the apparatus) without more taking the processing time is not disclosed.

SUMMARY OF THE INVENTION

The present invention is directed to a redundant control apparatus for improving reliability to diagnose whether operation data of two processing units matches without falling processing speed to comparatively decide the operation data.

According to an aspect of the present invention, there is provided a redundant control apparatus comprising: a first processing unit configured to execute a control program to input data; a second processing unit configured to execute the control program to the input data in parallel with the first processing unit; an input/output unit configured to generate the input data, and to receive one of two output data executed by the first processing unit and the second processing unit; and a channel selection unit configured to send the input data from the input/output unit to the first processing unit and the second processing unit in parallel, and to send the one to the input/output unit by selecting the one from the two output data; wherein the first processing unit and the second processing unit respectively comprise a program memory configured to store the control program; a control cycle synchronization unit configured to generate a clock signal at a rate quicker than a control cycle previously set, and to generate a control cycle signal using the clock signal at the control cycle, the control cycle signal being mutually sent between the first processing unit and the second processing unit; a processor configured to execute the control program in response to the clock signal and the control cycle signal; a data memory configured to store operation data including the input data, intermediate data being executed and output data executed by the processor; and a diagnostics unit configured to diagnose the operation data every control cycle; wherein the diagnostics unit comprises a summary information conversion unit configured to generate a summary information by compressing the operation data with a hash function; a summary information storage unit configured to store the summary information; a comparison unit configured to compare the summary information with the other summary information of the other processing unit, to decide whether the summary information matches the other summary information, and to output a decision signal to the channel selection unit; and a channel failure detection unit configured to diagnose a failure of each unit in the processing unit except for diagnostics of the summary information.

DETAILED DESCRIPTION OF THE EMBODIMENTS

Hereinafter, embodiments of the present invention will be explained by referring to the drawings. The present invention is not limited to the following embodiments.

The First Embodiment

Figure 1:
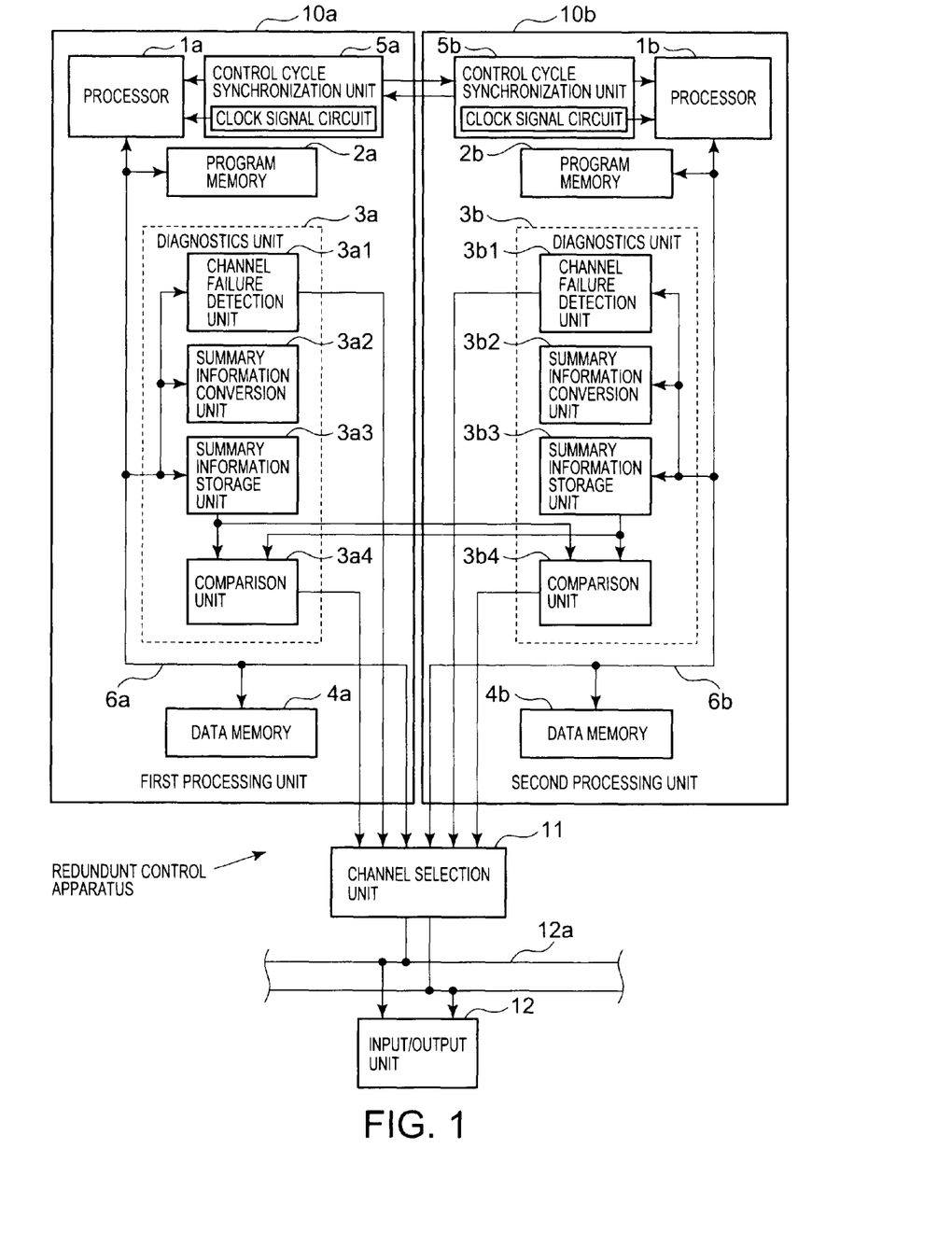
FIG. 1 is a block diagram of a redundant control apparatus according to a first embodiment.
Figure 2A:
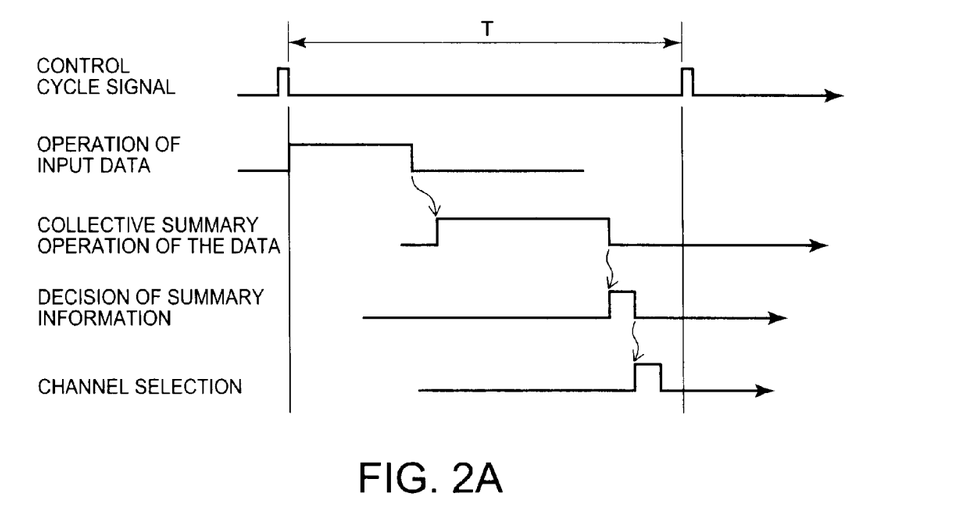
FIGS. 2A and 2B are time charts of processing of the redundant control apparatus according to the first embodiment and a second embodiment.
Figure 2B:
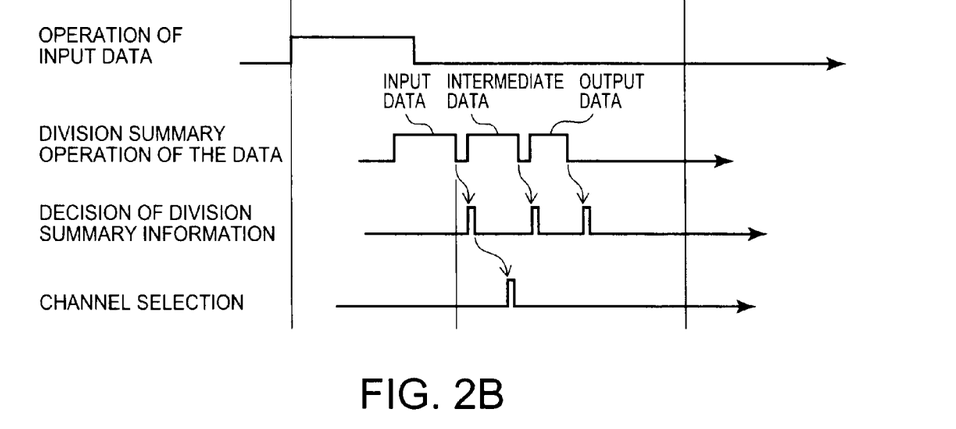
Figure 3:
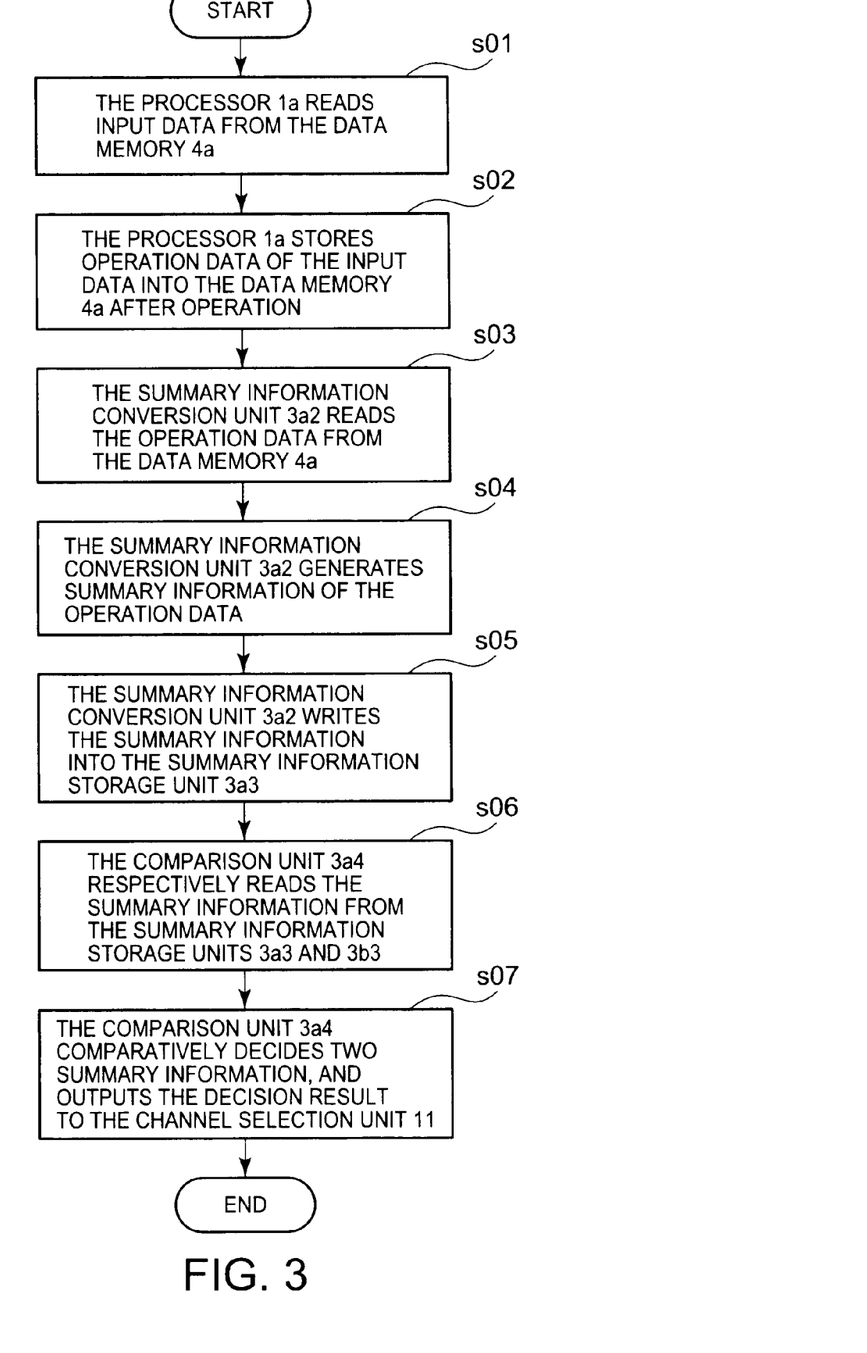
FIG. 3 is a flow chart of processing of the redundant control apparatus according to the first embodiment.

The redundant control apparatus of the first embodiment is explained by referring to FIGS. 1~3. FIG. 1 is a block diagram of the redundant control apparatus including two processing units to execute the same processing in parallel based on the same control program, for example, in a plant-control system. The two processing units respectively include a diagnostics unit to comparatively decide match/unmatch of operation data as a processing result. This control system may include a plurality of redundant control apparatuses, or a plurality of input/output units to process large scale input/output data.

In FIG. 1, the redundant control apparatus includes a first processing unit $10a$, a second processing unit $10b$, an input/output unit $12$, and a channel selection unit $11$. The first processing unit $10a$ and the second processing unit $10b$ synchronously execute the same control program to the same input data. The input/output unit $12$ generates signals from a large number of sensors (installed onto a plant not shown in Fig.) as input data, and sends any of output data processed by the first processing unit $10a$ and the second processing unit $10b$ to the sensors. The channel selection unit $11$ sends the input data (generated by the input/output unit $12$) to the first processing unit $10a$ and the second processing unit $10b$ in parallel via an input/output bus $12a$, and sends any of the output data (processed by the first processing unit $10a$ and the second processing unit $10b$) to the input/output unit $12$ via the input/output bus $12a$.

Components of the first processing unit $10a$ and the second processing unit $10b$ are same. Accordingly, the first processing unit $10a$ is only explained, and explanation for the second processing unit $10b$ is omitted.

The first processing unit $10a$ includes a program memory $2a$, a control cycle synchronization unit $5a$, a processor $1a$, a data memory $4a$, a diagnostics unit $3a$, and an internal bus $6a$. The program memory $2a$ stores a control program. The control cycle synchronization unit $5a$ includes a clock signal circuit, generates a clock signal at a speed sufficiently quicker than a control cycle previously set, and generates a control cycle signal at a timing of the control cycle by the clock signal. The control cycle synchronization units $5a$ and $5b$ mutually send the control cycle signal in order to synchronize the control cycle thereof. The processor $1a$ receives the clock signal and the control cycle signal, and executes the control program. The data memory $4a$ stores operation data of the processor $1a$. The operation data includes input data to be executed by the processor $1a$, intermediate data being executed by the processor $1a$, and output data from the processor $1a$. The diagnostics unit $3a$ compares the operation data (of the processors $1a$ and $1b$) at each control cycle, and decides whether the operation data matches. The internal bus mutually connects the processor $1a$, the program memory $2a$, the diagnostics unit $3a$ and the data memory $4a$.

Next, component of the diagnostics unit $3a$ is explained. The diagnostics unit $3a$ includes a summary information conversion unit $3a2$, a summary information storage unit $3a3$, a comparison unit $3a4$, and a channel failure detection unit $3a1$. The summary information conversion unit $3a2$ reads operation data (processed by the processor $1a$) from the data memory $4a$, compresses the operation data by executing hash operation to the operation data, and generates summary information. The summary information storage unit $3a3$ stores the summary information generated by the summary information conversion unit $3a2$. The comparison unit $3a4$ compares the summary information stored in the summary information storage unit $3a3$ with summary information generated by another diagnostics unit $3b$, and decides whether two operation data match. The channel failure detection unit $3a1$ detects failure of hardware such as a temperature sensor, and diagnoses failure of each unit (software) of the first processing unit $10a$ (excluding diagnostics of watchdog timer and the summary information).

Next, detail component of each unit is explained. The processor $1a$ which equips a main memory (not shown in Fig.) and has processing speed necessary to execute the control program is selected. Furthermore, the program memory $2a$ is composed by nonvolatile memory such as ROM, and previously stores basic software and a control program.

The data memory $4a$ is comprised by RAM, and stores input data sent by the channel selection unit $11$, intermediate data being processed by the processor $1a$, and output data (processed by the processor $1a$) to be sent to the input/output unit $12$.

The control cycle synchronization unit $5a$ equips a clock signal circuit, and sends a clock signal and a control cycle signal to the processor $1a$. The clock signal circuit generates the clock signal at a rate sufficiently quicker than the control cycle. In order to synchronize with a control cycle synchronization unit $5b$ in the second processing unit $10b$, the control cycle signal is generated at a timing of the control cycle by the clock signal, and sent to the control cycle synchronization unit $5b$. Briefly, the control cycle synchronization units $5a$ and $5b$ mutually send the clock cycle signal.

As to communication component of the first processing unit $10a$ and the second processing unit $10b$ to mutually synchronize, a communication protocol method using IC chip such as UART (Universal Asynchronous Receiver Transmitter) is generally used. However, the control cycle signal may be generated using only hardware.

Next, detail component of the diagnostics unit $3a$ is explained. The redundant control apparatus equips the first processing unit $10a$ and the second processing unit $10b$ each to execute in parallel. Regularly, these two processing units need to complete operation processing of the control program and diagnostics processing to decide reliability of operation data of the channel within a control cycle T (previously set). As shown in FIG. 2A, first, the operation processing is executed. After that, the diagnostics processing of the operation data (operation result) is executed.

However, when a system scale becomes large and a quantity of input data increases, not only the operation time but also diagnostics time to comparatively decide the operation data becomes long.

Accordingly, in component of the first embodiment, the processor 1a to execute the control program and the diagnostics unit 3a to diagnose the operation data are equipped, i.e., these two units share the processing function. The diagnostics unit 3a equips the summary information conversion unit 3a2 to compress the operation data using a hash function. By the hash function, even if the operation data increases, data to be compared is always set as a constant value, and a reliability to diagnose the operation data does not fall.

Then, summary information converted from the operation data is respectively stored in the summary information storage unit 3a3 and 3b3. After that, two hash values (respective summary information) are compared by the comparison unit 3a4 and 3b4. For example, when MD5 (Message Digest Algorithm) as one of hash function is used for a processor having operation frequency of 100 MHz, even if a total of the operation data is data of 1 Mbit, this data is converted to summary information of 128 Bit in time around 20 msec.

Furthermore, time to transfer from the summary information storage unit 3a3 and 3b3 to the comparison unit 3a4 is around 1 msec by using UART (Universal Asynchronous Receiver Transmitter) chip of 112 kbps. Accordingly, in comparison with regular control cycle 50~100 msec, a total time of conversion time 20 msec and transfer time 1 msec of the summary information can be within a range not to affect the control performance.

However, if the summary information conversion unit is not prepared and operation data of 1 Mbit is transferred at a rate 112 kbps, ten seconds are approximately taken. Accordingly, in order to transfer the operation data within a regular control cycle, the operation data need to be reduced as 10 kbit (1/100 of 1 Mbit).

Briefly, in the first embodiment, operation data to be compared is previously compressed by the summary information conversion unit 3a2. After that, compressed data is transferred to the comparison unit 3a4 and 3b4 of each processing unit 10a and 10b, and two compressed data of each processing unit 10a and 10b are compared by the comparison unit 3a4 and 3b4 respectively. As a result, reliability of the diagnostics does not fall.

Next, operation example of the channel selection unit 11 is explained. The channel selection unit 11 receives each output from the channel failure detection unit 3a1 and 3b1 (of the diagnostics unit 3a and 3b respectively) and each comparison decision output from the comparison unit 3a4 and 3b4. By a selection logic previously set, the channel selection unit 11 sends a selection signal to select one of outputs of two processing units 10a and 10b to the input/output unit 12.

As to the selection logic, for example, if two outputs from the channel failure detection units 3a1 and 3b1 are respectively "normal" and two comparison decision outputs from the comparison units 3a4 and 3b4 respectively represent "match", the channel selection unit 11 maintains the selection status.

If any of two comparison decision outputs from the comparison units 3a4 and 3b4 represent "unmatch", the channel selection unit 11 continually selects the channel (selected till then), and sends unmatch signal via the input/output bus. This unmatch signal is received by a monitor device (not shown in Fig.) and announced to an operator of this system from the monitor device.

Furthermore, if two outputs from the channel failure detection units 3a1 and 3b1 are respectively "failure" and both or any of two comparison decision outputs from the comparison units 3a4 and 3b4 represents "match", the channel selection unit 11 selects the channel by a priority order (previously set).

Furthermore, if any of two outputs from the channel failure detection units 3a1 and 3b1 is "failure", the channel selection unit 11 sends a failure signal via the input/output bus. This failure signal is announced to an operator of this system from the monitor device.

Next, operation of the redundant control apparatus (having above-mentioned component) is explained by referring to FIG. 3. First, the processor 1a reads out input data (sent by the channel selection unit 11 and stored in the data memory 4a) (s01). As to the input data read out, the processor 1a executes an operation based on the control program. Intermediate data and output date thereof are stored in the data memory 4a (s02).

The summary information conversion unit 3a2 reads out operation data (input data+intermediate data+output data) stored in the data memory 4a (s03). As to the operation data read out, the summary information conversion unit 3a2 executes conversion processing, and generates summary information which the operation data is compressed (s04).

Next, the summary information conversion unit 3a2 writes the summary information into the summary information storage unit 3a3 (s05). Then, the comparison unit 3a4 requests the summary information storage unit 3a3 and 3b3 to send the summary information (s06), and receives two summary information from the summary information storage unit 3a3 and 3b3. By comparing respective summary information, the comparison unit 3a4 decides whether the summary information match, and sends a decision result to the channel selection unit 11 (s07).

As mentioned-above, in the first embodiment, decision processing to compare the summary information (independently output from two processing units) is executed at a predetermined speed, and match/unmatch of all operation data can be diagnosed every control cycle (previously set). Accordingly, the redundant control apparatus to improve reliability of diagnostics is supplied. Furthermore, the processor 1a executes the control program, and the diagnostics unit 3a independently decides reliability of operation data. Accordingly, the control cycle can be shortened.

The Second Embodiment

Figure 4:
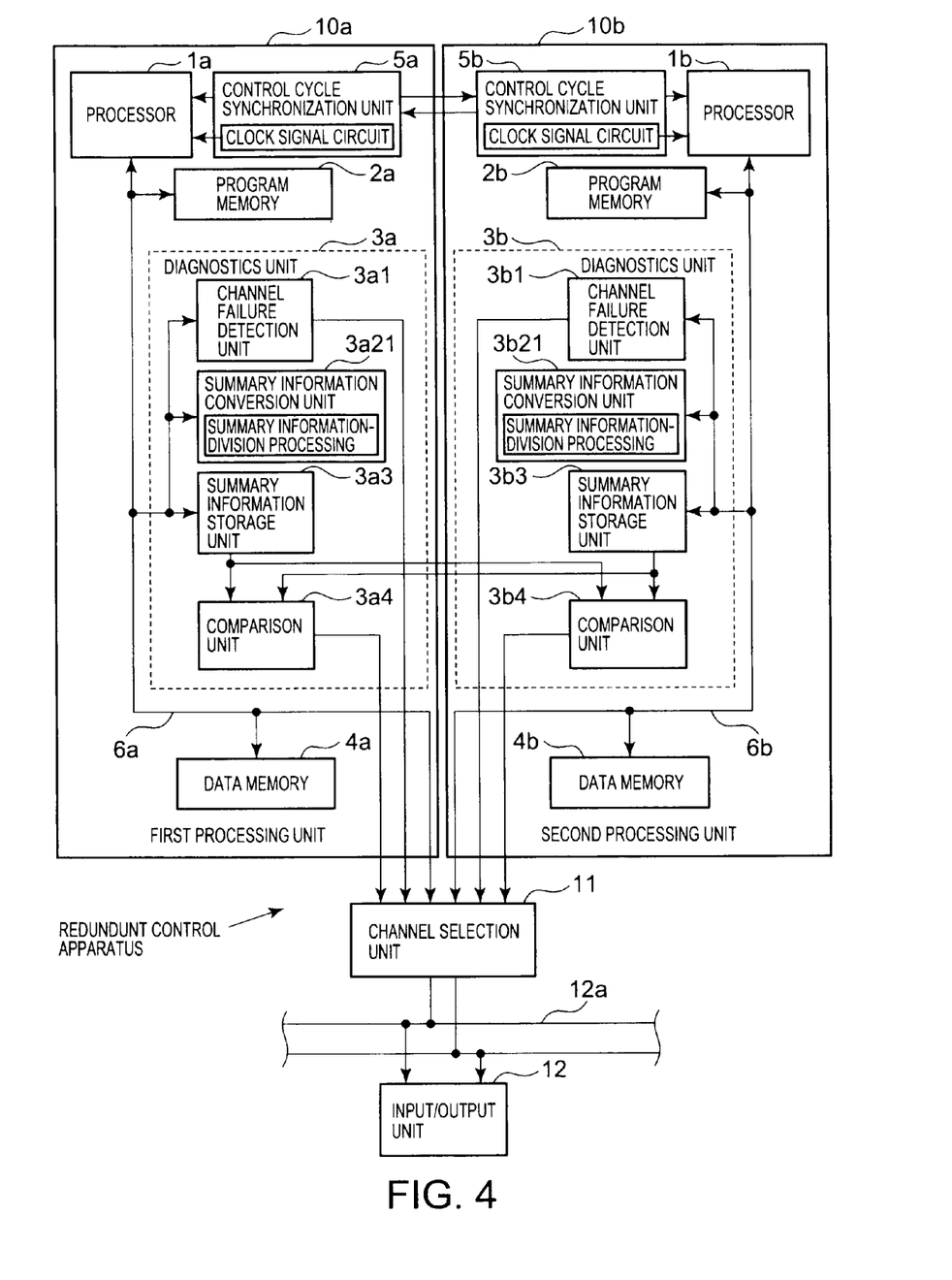
FIG. 4 is a block diagram of the redundant control apparatus according to the second embodiment.

Next, the redundant control apparatus of the second embodiment is explained by referring to FIGS. 4 and 2B. As to each unit of the second embodiment same as in FIG. 1, the same number is assigned and its explanation is omitted.

As a feature of the second embodiment different from the first embodiment, the summary information conversion unit 3a2 of the first embodiment collectively generates summary information from operation data processed by the processor 1a. However, the summary information conversion unit 3a21 of the second embodiment respectively generates division summary information from input data, intermediate data and output data (processed by the processor 1a) stored in the data memory 4a, and comparatively decides whether two division summary information (of input data, intermediate data, output data, respectively) match.

Briefly, as shown in FIG. 2B, input data, intermediate data and output data are respectively operated and stored in the data memory 4a. After that, division summary information of each data (the input data, the intermediate data, the output data) is differently decided to be compared.

According to the second embodiment having above-mentioned component, a comparative decision result of respective division summary information is output. Accordingly, by identifying a unit in which unmatch occurs, the reason why unmatch occurs can be quickly studied and treated.

The Third Embodiment

Figure 5:
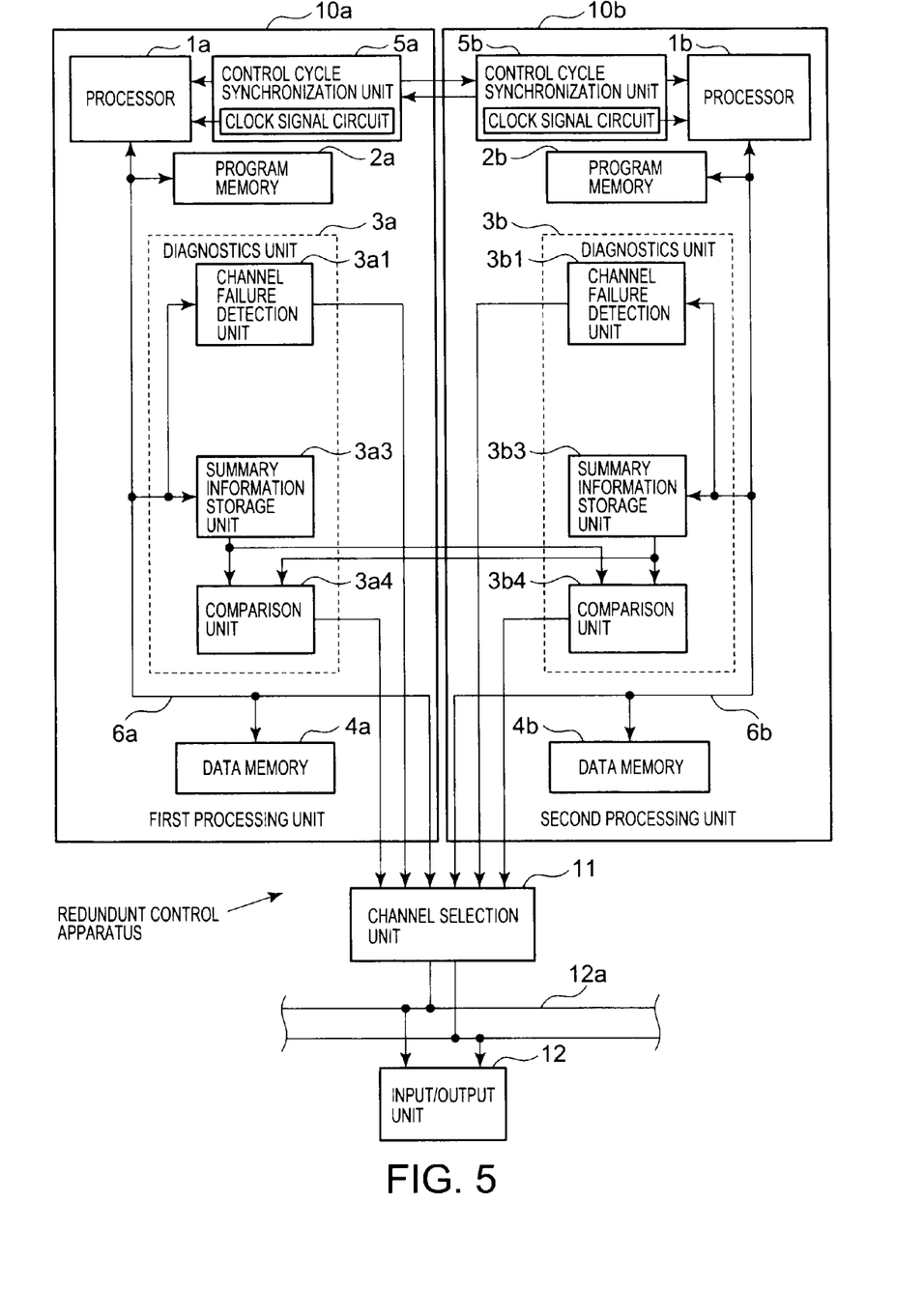
FIG. 5 is a block diagram of the redundant control apparatus according to a third embodiment.
Figure 6:
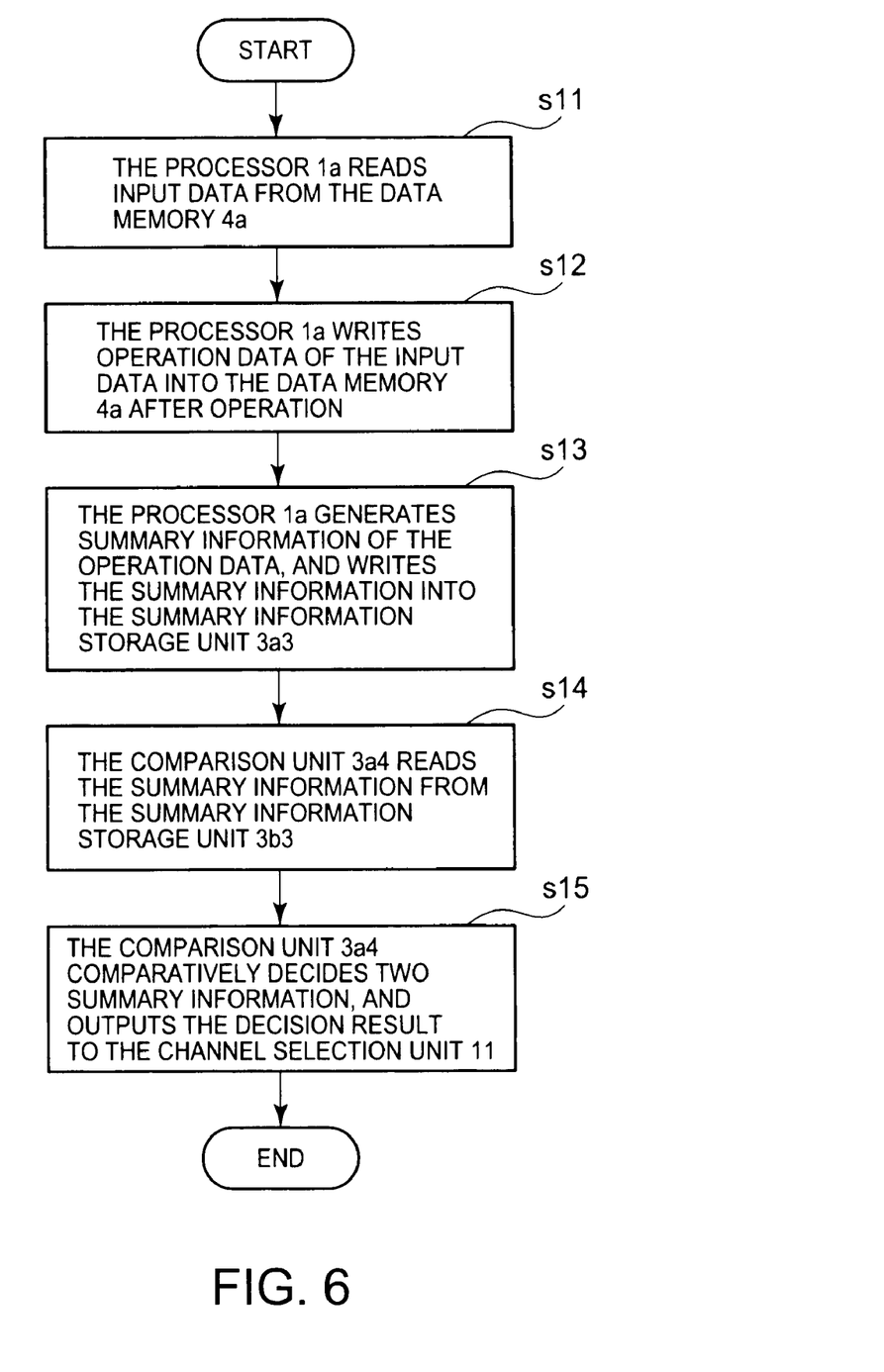
FIG. 6 is a flow chart of processing of the redundant control apparatus according to the third embodiment.

Next, the redundant control apparatus of the third embodiment is explained by referring to FIGS. 5 and 6. As to each unit of the third embodiment same as in FIG. 1, the same number is assigned and its explanation is omitted.

As a feature of the third embodiment different from the first embodiment, the summary information conversion unit 3a2 of the first embodiment collectively generates summary information from operation data processed by the processor 1a. However, in the third embodiment, the summary information conversion unit 3a2 is deleted, and conversion processing to generate summary information from operation data (processed by the processor 1a) is executed by the processor 1a itself.

This operation is explained by referring to FIG. 6. First, the processor 1a reads out input data (sent by the channel selection unit 11 and stored in the data memory 4a) (s11). As to the input data read out, the processor 1a executes an operation based on the control program. Intermediate data and output date thereof are stored at a region (different from the input data) in the data memory 4a (s12).

The processor 1a reads all operation data (input data+ intermediate data+output data) used in the control cycle from the data memory 4a. As to the operation data read out, the processor 1a executes conversion processing, and generates summary information which the operation data is compressed (s13).

Next, the processor 1a writes the summary information into the summary information storage unit 3a3 (s14). By writing the summary information into the data memory 4a, the summary information storage unit 3a3 may be deleted. In this case, the data memory 4a needs to send the summary information to the comparison unit 3a4.

After that, the comparison unit 3a4 requests the summary information storage unit 3a3 and 3b3 to send the summary information. By comparing the summary information respectively received, the comparison unit 3a4 decides whether the summary information match, and sends a decision result to the channel selection unit 11 (s15).

As mentioned-above, in the third embodiment, the processor 1a executes operation processing based on the control program, and conversion processing to generate the summary information from the operation data. Accordingly, the diagnostics unit 3a need not prepare the summary information conversion unit 3a2. In this component, the control cycle needs to be set by considering that a load of the processor 1a becomes larger.

The present invention is not limited to above-mentioned embodiments. For example, two processing units execute the control program in parallel, generates summary information from operation data, and comparatively decides whether the summary information (of the two processing units) match every control cycle. Briefly, any processing unit executable above processing in the control cycle (previously set) can be used.

While certain embodiments have been described, these embodiments have been presented by way of examples only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A redundant control apparatus comprising:
a first processing unit configured to execute a control program to input data;
a second processing unit configured to execute the control program to the input data in parallel with the first processing unit;
an input/output unit configured to generate the input data, and to receive one of two output data executed by the first processing unit and the second processing unit; and
a channel selection unit configured to send the input data from the input/output unit to the first processing unit and the second processing unit in parallel, and to send the one to the input/output unit by selecting the one from the two output data;
wherein the first processing unit and the second processing unit respectively comprise
a program memory configured to store the control program;
a control cycle synchronization unit configured to generate a clock signal at a rate quicker than a control cycle previously set, and to generate a control cycle signal using the clock signal at the control cycle, the control cycle signal being mutually sent between the first processing unit and the second processing unit;
a processor configured to execute the control program in response to the clock signal and the control cycle signal;
a data memory configured to store operation data including the input data, intermediate data being executed and output data executed by the processor; and
a diagnostics unit configured to diagnose the operation data every control cycle;
wherein the diagnostics unit comprises
a summary information conversion unit configured to generate a summary information by compressing the operation data with a hash function;
a summary information storage unit configured to store the summary information;
a comparison unit configured to compare the summary information with the other summary information of the other processing unit, to decide whether the summary information matches the other summary information, and to output a decision signal to the channel selection unit; and
a channel failure detection unit configured to diagnose a failure of each unit in the processing unit except for diagnostics of the summary information.

2. The apparatus according to claim 1, wherein
an algorithm of the hash function is MD5 to output a hash value having a fixed-length 128 Bit from the operation data.

3. The apparatus according to claim 1, wherein
the summary information storage unit stores division summary information as respective summary information of the input data, the intermediate data and the output data, and
the comparison unit compares the division summary information with the other division summary information of the other processing unit.

4. A redundant control apparatus comprising:
a first processing unit configured to execute a control program to input data;
a second processing unit configured to execute the control program to the input data in parallel with the first processing unit;
an input/output unit configured to generate the input data, and to receive one of two output data executed by the first processing unit and the second processing unit; and
a channel selection unit configured to send the input data from the input/output unit to the first processing unit and the second processing unit in parallel, and to send the one to the input/output unit by selecting the one from the two output data;
wherein the first processing unit and the second processing unit respectively comprise
a program memory configured to store the control program;
a control cycle synchronization unit configured to generate a clock signal at a rate quicker than a control cycle previously set, and to generate a control cycle signal using the clock signal at the control cycle, the control cycle signal being mutually sent between the first processing unit and the second processing unit;
a processor configured to execute the control program in response to the clock signal and the control cycle signal;
a data memory configured to store operation data including the input data, intermediate data being executed and output data executed by the processor; and
a diagnostics unit configured to diagnose the operation data every control cycle;
wherein the processor generates a summary information by compressing the operation data with a hash function;
wherein the diagnostics unit comprises
a summary information storage unit configured to store the summary information;
a comparison unit configured to compare the summary information with the other summary information of the other processing unit, to decide whether the summary information matches the other summary information, and to output a decision signal to the channel selection unit; and
a channel failure detection unit configured to diagnose a failure of each unit in the processing unit except for diagnostics of the summary information.

* * * * *